UNITED STATES PATENT OFFICE.

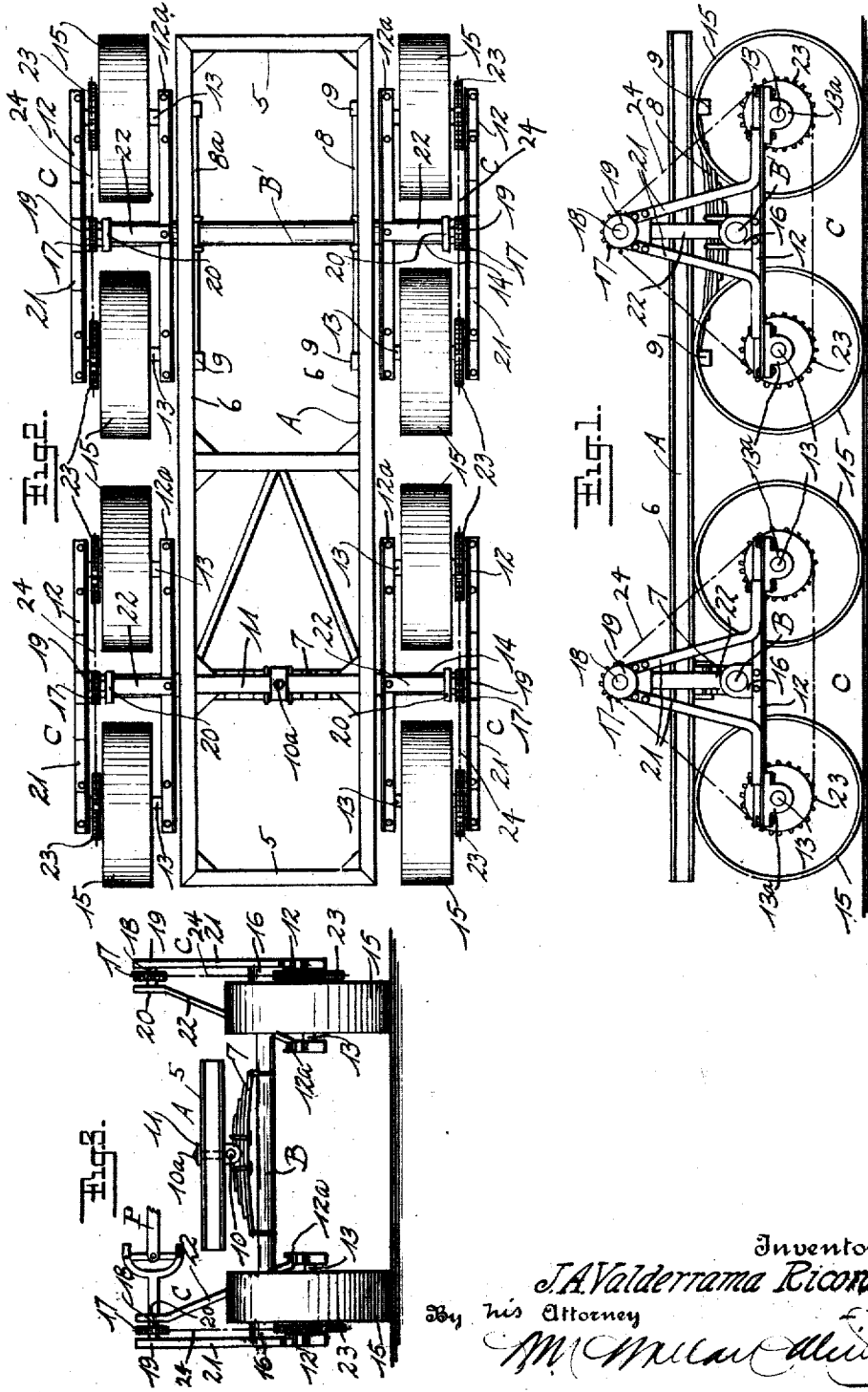

JUAN ALBERTO VALDERRAMA RICORDI, OF NEW YORK, N. Y.

TRACTOR.

1,372,052.　　Specification of Letters Patent.　Patented Mar. 22, 1921.

Application filed April 8, 1918. Serial No. 227,266.

*To all whom it may concern:*

Be it known that I, JUAN ALBERTO VALDERRAMA RICORDI, a citizen of the Republic of Peru, residing at 117 West 49th street, city, county, and State of New York, U. S. A., have invented new and useful Improvements in Tractors, of which the following is a specification.

My invention relates to improvements in the construction of and the driving means for motor vehicles, and more particularly tractors.

An object of my invention is the provision of a tractor having a plurality of wheel trucks each mounted for oscillatory movement to permit the wheels to conform to any uneven surface and to thus maintain the stability of the vehicle when traveling.

Another object of my invention is the provision of a wheel truck of the character above described having driving wheels mounted thereon independently of each other, and power transmission means associated with the wheel truck for driving the wheels thereof in synchronism.

Another object of my invention is the provision of a novel means for supporting the chassis of the tractor upon the wheel trucks.

I will describe one form of tractor embodying my invention, and will then point out the novel features thereof in claims.

In the accompanying drawings,

Figure 1 is a view showing in side elevation one form of tractor embodying my invention;

Fig. 2 is a view showing in top plan the tractor shown in Fig. 1; and

Fig. 3 is a view showing in end elevation the tractor shown in the preceding views, looking at the left-hand end of Figs. 1 and 2.

Similar reference characters refer to similar parts in each of the several views.

Referring to the drawings in detail, and particularly to Fig. 2, A designates generally a chassis which, as here shown, comprises end rails 5 and side rails 6 connected end to end and arranged in the form of a rectangle. The chassis A is supported adjacent its opposite ends by semi-elliptical springs 7, 8 and 8ª. The springs 8 and 8ª extend longitudinally of the chassis and are suspended in depending relation thereto by means of brackets 9, while spring 7 extends transversely of the chassis and is pivotally connected at its medial portion, as at 10, to a king bolt 10ª which latter is in turn rotatably mounted on the cross bar 11, as shown in Fig. 3. The spring 7 is supported upon and connected to an axle B, as shown in Fig. 3, 3 while springs 8 and 8ª are supported at their medial portions by another axle B'. Such an arrangement of springs affords an extremely resilient support for the chassis and thus minimizes the vibrations to which a tractor chassis is usually subjected.

The chassis A is primarily supported by means of the axles B and B', which axles extend transversely of the chassis and have their opposite ends journaled in wheel trucks designated generally at C. As here shown, each wheel truck C comprises spaced parallel L-bars 12 and 12ª connected at their opposite ends by stub-axles 13, journaled in bearings 13ª, and at their medial portions by a brace bar 14, as clearly shown in Fig. 2. Journaled on each stub axle 13 is a tractor wheel 15, which wheel is of the usual construction and forms no part of the present invention. Secured to the medial portion of the L-bar 12ª is a journal box 16 in which one end of the axle B or B' is journaled. This mounting permits each entire truck C to rock or oscillate about the axle B or B' as a center so that the wheels 13 are in constant contact with the ground thereby maintaining the stability of the chassis A when traveling over uneven surfaces. By providing the chassis with four such wheel trucks arranged as shown in Fig. 2 and each having mounted thereon two wheels, I produce a mounting which will equalize the most uneven surfaces over which a tractor travels, thus maintaining the stability of the tractor at all times.

For driving the tractor, I provide power transmission means for synchronously driving the wheels 15 of each truck C, so that the tractor is provided with eight driving wheels. As here shown, this power transmission comprises a driving gear 17 fixed to a shaft 18 journaled in bearings 19 and 20. The inner end of the shaft 18 is operatively connected to a power shaft P by a universal joint J, the latter being of suitable form to permit the shaft P to properly drive the shaft 18 when the latter is in any of the positions which it assumes as a result of the movement of the wheel truck when the wheels are traveling over an uneven surface. The outer bearing 19 is supported between the upper ends of a pair of vertically disposed standards 21, which standards are inclined toward each other as clearly shown in Fig. 1, and have their lower ends bent in opposite directions to lie in a horizontal plane, and secured to the outer bar 12 by means of bolts. The inner bearing 20 is formed in the upper end of an upright 22, which latter is secured at its lower end to the inner bar 12ª. As shown in Fig. 3, the upright 22 is inclined toward the standard 21, the upper end being arranged in parallelism with the standard. Fixed to each stub-axle at a point between a corresponding wheel 15 and the outer bar 12 is a relatively large driven gear 23, and trained about the gears 23 of each pair of wheels and the corresponding driving gear 17 is an endless chain 24 which is shown diagrammatically in all of the views by the dot and dash lines. Power in any suitable manner is applied to the power shaft P whereby the wheels 15 of each truck are driven in synchronism. Owing to the fact that the entire driving means is mounted entirely on each wheel truck C, a constant drive is maintained irrespective of any position a truck may assume when traveling over uneven surfaces.

It will be manifest from the foregoing description taken in conjunction with the accompanying drawings that, should the wheels encounter any obstruction or sink into a rut, the vertical movement thereof will not be transmitted to the chassis so as to impart a violent shock to the same, as the vertical movement of the wheels will be accommodated by the pivotal mounting of the corresponding wheel truck, wherefore it will be evident that by providing four separate and independent wheel trucks, I prevent the most severe shocks and provide a tractor which is capable of traversing very rugged country with substantially no displacement of or shock to the chassis.

Although I have herein shown and described only one form of tractor embodying my invention, it is understood that various changes and modifications may be made within the scope of the appended claims without departing from the spirit and scope of this invention.

What I claim is:

1. In combination, a chassis, shafts supporting said chassis, trucks mounted for oscillatory movement upon the opposite ends of said shafts, each truck comprising spaced parallel bars connected at their opposite ends by stub-axles, standards fixed to the outer bar of said bars, an upright fixed to the inner bar of said bars and spaced from said standards; wheels fixed to each of said stub-axles, a driven gear fixed to each of said stub-axles, a driving gear journaled in said upright and standards, and means for operatively connecting said driving and driven gears.

2. In combination, a chassis, a pair of shafts supporting said chassis, a semi-elliptical spring interposed between one of said shafts and said chassis and arranged transversely of the latter, a pair of springs interposed between the second shaft and said chassis and extending longitudinally of the latter, wheel trucks pivotally mounted upon the opposite ends of said shafts, wheels journaled in said trucks and power transmission means carried by each of said wheel trucks for driving the wheels thereof.

In testimony whereof I have signed my name to this specification.

JUAN ALBERTO VALDERRAMA RICORDI.